T. E. NEEDLER.
ENGINE.
APPLICATION FILED DEC. 3, 1913.

1,207,608.

Patented Dec. 5, 1916.
4 SHEETS—SHEET 3.

Witnesses
W. S. McDowell
P. M. Smith

Inventor
T. E. Needler
By Victor J. Evans
Attorney

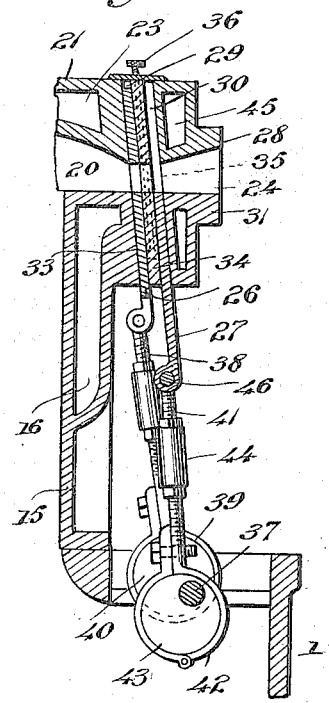
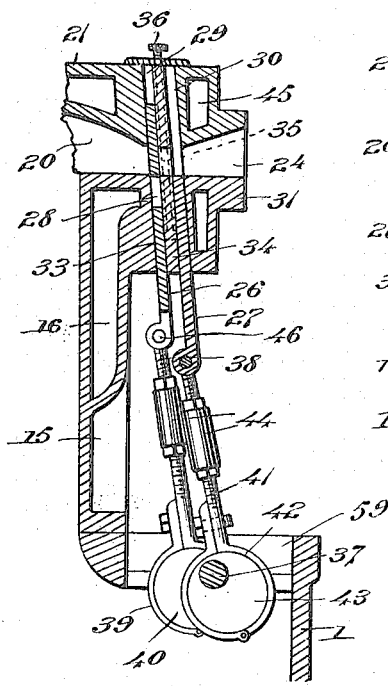
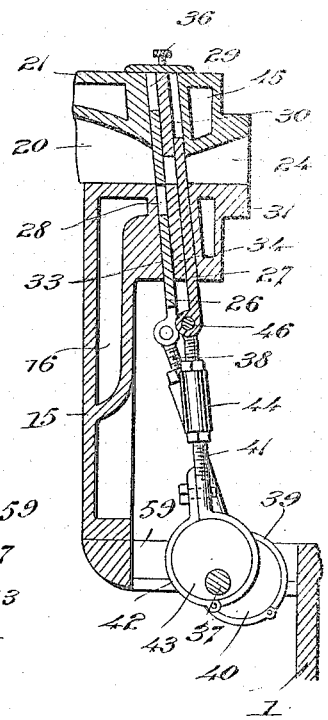
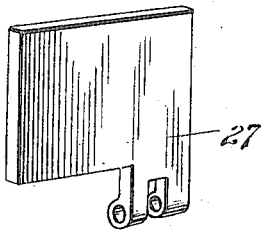
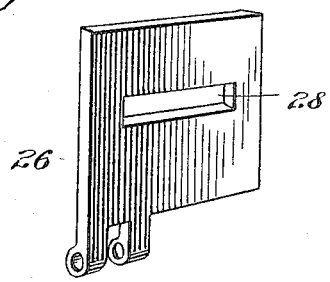

UNITED STATES PATENT OFFICE.

TILLFRED ELMO NEEDLER, OF MOBILE, ALABAMA.

ENGINE.

1,207,608.  Specification of Letters Patent.  Patented Dec. 5, 1916.

Application filed December 3, 1913. Serial No. 804,497.

*To all whom it may concern:*

Be it known that I, TILLFRED ELMO NEEDLER, a citizen of the United States, residing at Mobile, in the county of Mobile and State of Alabama, have invented new and useful Improvements in Engines, of which the following is a specification.

This invention relates to internal combustion engines, the main object of the invention being to produce a simple, novel and effective valve gear for engines of the class described which will render the engine practically noiseless, the valves being operated with a positive movement so as to insure the proper timing of said valves in their opening and closing movements.

Another object of the invention is to provide for far greater accessibility than is present in engines now in use, the construction hereinafter described enabling the carbon to be removed from the cylinders without taking down the engine and without removal of any parts of the engine excepting only the intake and exhaust manifolds. The valves may be removed without disturbing any other part of the engine. Likewise, the crank shaft, piston, connecting rods and the adjacent parts including the bearings may be removed by simply detaching the lower section of the crank case. Furthermore, all operating parts of the engine are inclosed in a tight housing excepting only the magneto and the cooling fan which is driven by a belt from the crank shaft. The engine also enables a greater quantity of water to be employed for keeping the engine cool, the engine as a whole operating with a minimum amount of friction and heat and with a corresponding increase in general efficiency and power.

With the above and other objects in view, the invention consists in the construction, combination and arrangement of parts, as will hereinafter be more fully described, illustrated and claimed.

Figure 1:
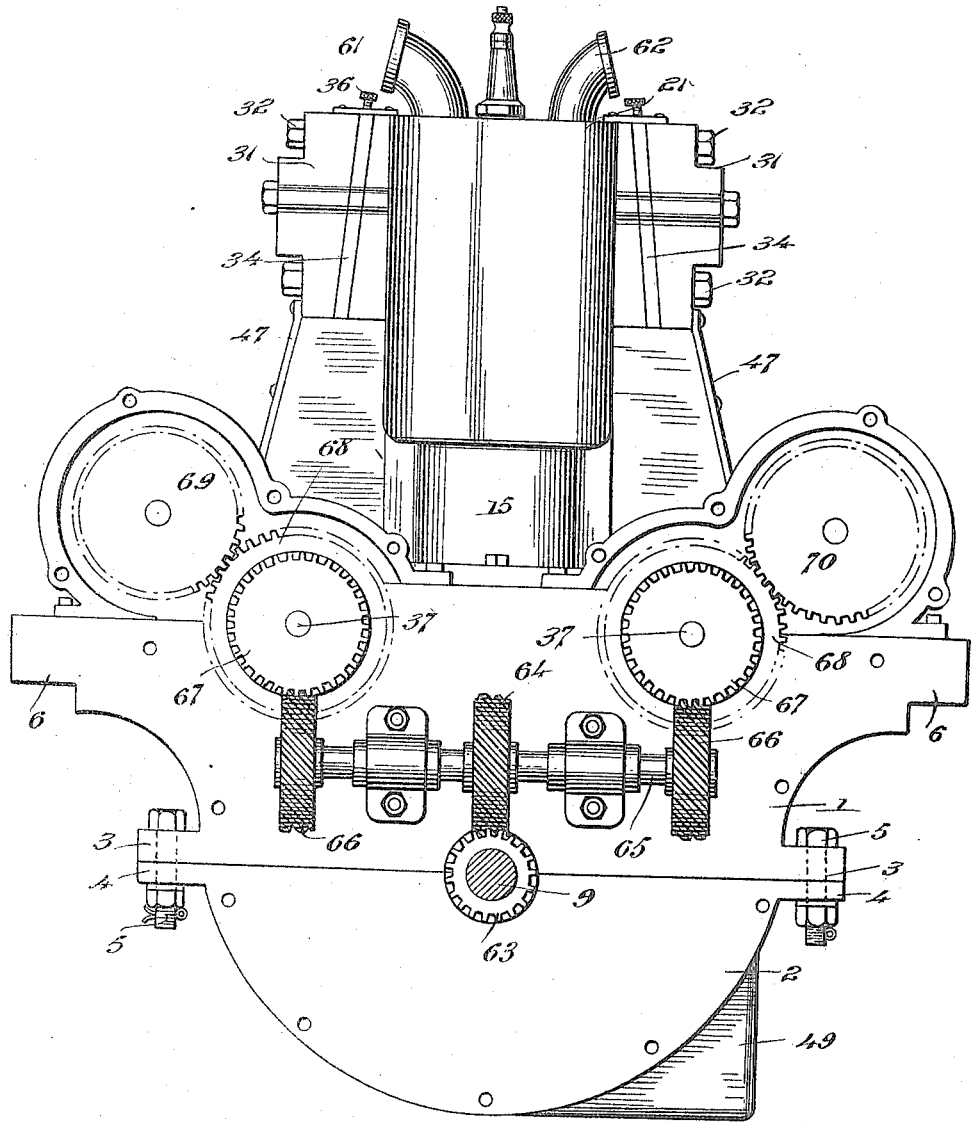
Figure 2:
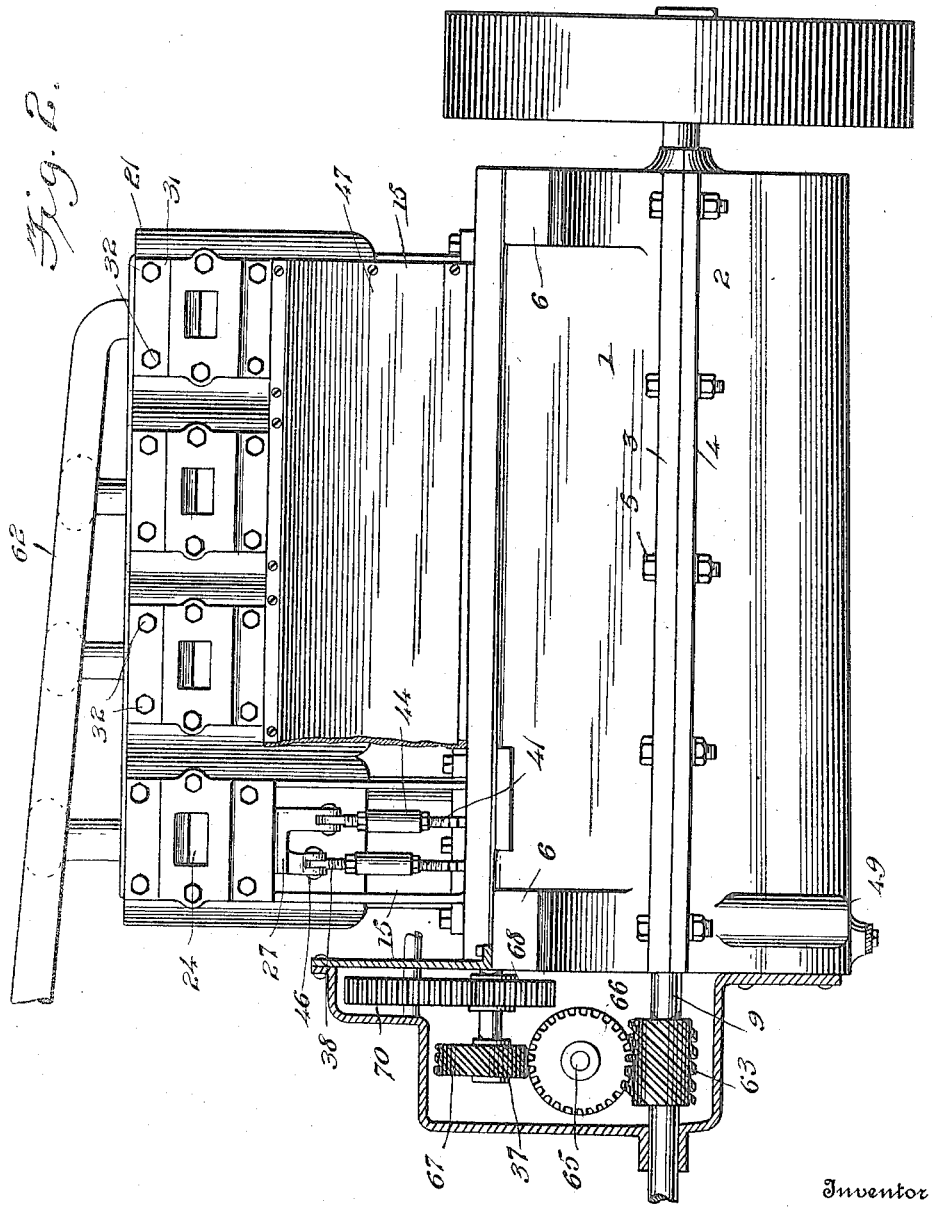
Figure 3:
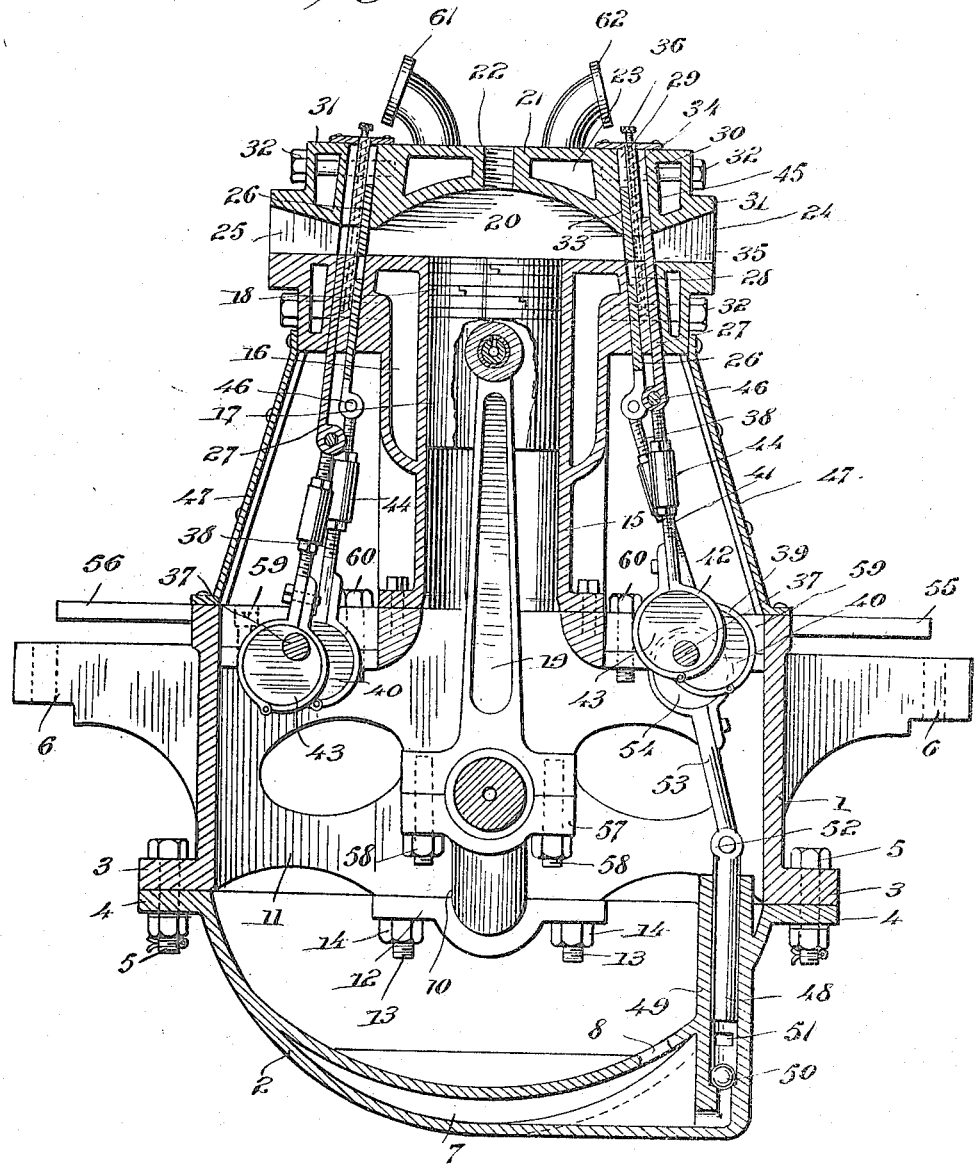

In the accompanying drawings:—Figure 1 is an end elevation of an internal combustion engine embodying the present invention. Fig. 2 is a side elevation of the same. Fig. 3 is a vertical cross section taken diametrically of one of the cylinders. Fig. 4 is a detail vertical section through one of the valves showing the same open. Fig. 5 is a similar view showing the inner valve section closed. Fig. 6 is a similar view showing the outer valve section closed. Fig. 7 is a perspective view of the outer valve section. Fig. 8 is a similar view of the inner valve section.

The internal combustion engine contemplated in this invention and which is especially designed for use in aeroplanes, automobiles, motorcycles, boats or as a stationary engine, comprises a crank case embodying an upper section 1 and a lower section 2, said crank case sections being flanged as shown at 3 and 4 and fastened together by bolts 5 or the equivalent thereof.

The upper crank case section 1 is provided with oppositely extending supporting arms or lugs 6 to adapt the engine to be mounted on a suitable supporting base and the lower crank case section 2 is provided with an inverted crescent shaped oil sump or reservoir 7 provided with an orifice 8 affording communication between said sump and the space in which the crank shaft and connecting rods are contained.

9 designates a crank shaft which is mounted in bearings 10 supported within the upper section 1 of the crank case by means of braces or webs 11, each crank shaft bearing embodying a lower detachable cap 12 secured in place by bolts 13 on the lower end of which are removable nuts 14 which provide for detaching the caps 12 in order to remove the crank shaft 9 and the connecting rods and pistons through the bottom of the crank case when the bottom section 2 thereof is detached.

Mounted on the upper section 1 of the crank case is a plurality of cylinders 15 water jacketed as at 16 and each containing a reciprocatory piston 17 provided with the usual piston rings 18.

19 designates the connecting rod interposed between the piston 17 and the crank shaft 9.

20 designates the combustion and compression chamber in the head 21 of the cylinder, the head being bored and threaded as shown at 22 to receive a spark plug and said head being water jacketed as at 23.

In carrying out the present invention, diametrically opposite inlet and exhaust ports 24 and 25, respectively, communicate with the compression space 20 preferably on an approximate level with the top of the piston 17 when the latter is at the outer end of its compression stroke. This enables carbon to be removed from the piston head and cylinder head by introducing suitable tools or instruments through the oppositely located ports 24 and 25. The inlet and exhaust valves of this invention are identical with respect to their construction and operation and therefore a description of one valve will answer for both.

Referring, for example, to the intake valve, it will be observed that said valve is formed in two sections, an inner section 26 and an outer section 27. Each of said sections is in the form of a flat plate, the outer section 27 being shorter or of less vertical length than the inner section 26, the last named section being formed with a port 28 which corresponds in shape and size with the intake port 24.

The two sections of the valve are mounted to reciprocate back and forth side by side in parallel ways 29 and 30 contained in a valve case the inner wall of which is preferably formed by the cylinder casting, the outer section 31 of the valve case being detachable from the body of the cylinder and being securely held in place by cap screws 32 or their equivalent.

By reference to Fig. 3 it will be noted that the valves operate in a path which is slightly oblique to a vertical plane, the cylinder casting being provided with a correspondingly inclined machined face 33 against which the detachable section 31 of the valve case is secured to form a gas tight joint. The guide ways 29 and 30 in which the valve sections slide up and down are separated by an intervening wall or web 34 which is formed with a longitudinally extending oil duct 35 provided at the upper end with a suitable oil cup 36, the lower end of the duct 35 being extended in opposite directions so as to furnish lubricant to the adjacent faces of the valve sections 26 and 27 as clearly shown in the drawings.

The means for operating the valves comprises a valve actuating shaft 37, one of said shafts being used at each side of the engine, one shaft serving to actuate the intake valve sections and the other shaft serving to actuate the exhaust valve sections. The inner valve section 26 is connected by a rod 38 to a strap 39 encircling an eccentric 40 on the shaft 37. The outer valve section 27 is connected by a rod 41 to a strap 42 encircling another eccentric 43 on the shaft 37. The two eccentrics 40 and 43 are set at the proper degree apart to insure the required timing of the valve sections in the manner illustrated in Figs. 4, 5 and 6.

In Fig. 4 the inner and outer valve sections register with the port 24, leaving said port entirely open to admit a charge of gas. In Fig. 5 the inner valve section has moved downwardly so as to carry the port 28 out of register with the port 24. In Fig. 6 the outer valve section 27 has been moved upwardly to a point where it closes the port 24.

Therefore, in all positions except the position shown in Fig. 4, either one or the other sections of the valve entirely obstructs and closes the port 24. Thus said port is opened only once in each complete cycle of operation of the engine which in the four-cycle engine means that the intake port is opened only once in every two revolutions of the crank shaft. The same construction and operation is true with respect to the exhaust valves at the opposite side of the engine.

In order to provide for an accurate adjustment of the valve sections with respect to the valve shaft 37, each of the connecting rods 38 and 40 is made longitudinally extensible by means of a turn buckle 44 engaging the right and left hand threaded ends of the sections of said rods 38 and 41 as clearly indicated in the drawings. This also enables a greater or less opening of the intake and exhaust ports to be obtained in accordance with the demands of the engine. It will also be noted that each of the detachable valve case sections 31 is water jacketed as at 45 thus enabling the valve sections to be maintained in a cool condition, preventing the same from expanding and binding in their cases. The rods 38 and 39 are pivotally connected or jointed to their respective valve sections as shown at 46 and are inclosed by casing plates or sections 47 which assist in rendering the engine noiseless in operation as they act to muffle any noise caused by looseness or play in the joints 46 or between the eccentrics and straps 40 and 39.

48 designates a plunger oil pump which operates in a pump cylinder 49 communicating with the oil sump in the bottom of the crank case and operating in conjunction with a ball check or foot valve 50, the oil being pumped through a distributing pipe 51 to various parts of the engine wherever needed. The piston 48 of the pump has a jointed connection at 52 with an operating rod 53 which is actuated by an eccentric 54 on the shaft 37 thus providing for a continuous feed of oil to the various working faces and parts of the engine.

At one side the engine is provided with a magneto supporting shelf or bracket 55 while at the opposite side a similar shelf or bracket 56 is provided for mounting the water circulating pump (not shown). Each of the connecting rods 19 has a detachable bottom bearing cap 57 which may be taken off by removing the bottom nuts 58 when it is desired to disconnect said rods from the crank shaft for the purpose of removing the latter through the bottom of the crank case. In like manner the valve actuating shafts 37 may be removed from the upper section 1 of the crank case by taking out the detachable bearing caps 59 which are held in place by cap screws 60 or their equivalent.

61 and 62 designate the water inlet and outlet connections leading to the water jacket spaces in the cylinder, cylinder head and valve cases.

From the foregoing description it will now be seen that a practically noiseless internal combustion engine is produced, all spring pressed puppet valves and the like being done away with and in lieu thereof silently reciprocating valves being employed in which the valve sections counterbalance each other and operate with a minimum amount of friction and wear. The construction also to a great extent eliminates the necessity of taking down the engine in order to obtain access to some small part which in the ordinary construction of engine now in common use is inaccessible. Unusually generous bearings may be provided by reason of the construction shown and described for the crank shaft and connecting rods and said bearings may be easily reached and the cap portions thereof detached with an ordinary wrench. There are no springs or delicate parts to become broken or get out of order, the valves are operated positively both for the intake and exhaust of the gases and all wearing surfaces are of considerable area thereby increasing the life and durability of the engine as a whole.

In order to still further carry out the noiseless feature of the engine, the crank shaft 9 is provided with a spiral pinion 63 which meshes with a spiral gear wheel 64 on a countershaft 65 on which are other spiral gear wheels 66 which mesh with and drive corresponding gear wheels 67 fast on the ends of the two valve operating shafts 37. Spur gear wheels 68 on the countershafts 37 mesh with other gear wheels 69 and 70 on the pump shaft and magneto shaft respectively for driving said pump and magneto. All of these gears are inclosed in an air tight gear case and run in oil.

What I claim is:—

In an internal combustion engine, a cylinder of the T head type comprising diametrically opposite intake and exhaust chambers at the same elevation, an upwardly and inwardly inclined slide valve in each of said chambers comprising two plate like valve members mounted for reciprocatory movement, one of said valve members being formed with a port and the other member being portless but adapted to cover and uncover the engine port, a plate partition between said valve members, a crank case having openings through the top wall thereof, valve operating shafts intersecting said openings, valve operating eccentrics on said shafts, longitudinally adjustable connections between said eccentrics and valve members, upwardly and inwardly sloping housing plates inclosing said openings in the top of the crank case, and driving means between said valve operating shafts and the engine crank shaft.

In testimony whereof I affix my signature in presence of two witnesses.

TILLFRED ELMO NEEDLER.

Witnesses:
W. W. WOODRUFF,
MARY ELLEN RING.

Copies of this patent may be obtained for five cents each, by addressing the "Commissioner of Patents, Washington, D. C."